United States Patent [19] [11] 4,311,087
Brinkman [45] Jan. 19, 1982

[54] CHEESE-DRAINING APPARATUS
[75] Inventor: Gerrit E. Brinkman, La Celle-St-Cloud, France
[73] Assignee: Alfa-Laval S.A., Les Clayes Sous Bois, France
[21] Appl. No.: 122,616
[22] Filed: Feb. 19, 1980
[51] Int. Cl.³ .............................................. A01J 25/13
[52] U.S. Cl. ...................................... 99/456; 99/644; 425/84; 425/439
[58] Field of Search .................. 99/456, 452, 457–460, 99/465, 495, 496, 644; 425/84, 439; 249/137; 134/84, 92, 137, 201

[56] References Cited
U.S. PATENT DOCUMENTS
438,073 10/1890 Ford ....................................... 99/644
537,226 4/1895 Ohl ......................................... 99/458
2,114,277 4/1938 Bloomfield ........................... 99/452
2,654,151 10/1953 Miollis ................................. 99/458
3,221,407 12/1965 Jagoueix ............................. 99/458

Primary Examiner—Philip R. Coe
Assistant Examiner—Timothy F. Simone
Attorney, Agent, or Firm—Cyrus S. Hapgood

[57] ABSTRACT

Multi-cavity molds coact with respective table elements forming a drainage table. Between each mold and the corresponding table element is a connecting means allowing the mold to slide between a normal cheese-draining position against the table element and a cleaning position spaced from the table element. The connecting means include abutments limiting said sliding of the mold and on which the mold is supported in said cleaning position thereof.

9 Claims, 4 Drawing Figures

CHEESE-DRAINING APPARATUS

For draining molded curd used in the production of certain cheeses, as well as for draining certain cheeses, molds are used. These molds are of circular, oval, square, rectangular or polygonal base and are generally grouped together to form multi-cavity molds which are mounted on tables (sometimes called benches) grooved to facilitate the drainage of the whey. A blind is generally interposed between the table and the multi-cavity mold to keep the curd together and for better drainage of the base surface of the cheese. The multi-cavity molds may be assembled in a plurality of rows; and they may be completed by raised portions.

The tables, blinds and multi-cavity molds constitute a varied equipment which requires considerable manpower to assemble the parts for the manufacture of the cheese and to dismantle the parts for washing.

The subject of the present invention is an assembly of tables and multi-cavity molds (and possibly blinds) serving for the drainage of cheeses and in which the parts are assembled once and for all without impairing the efficiency of the cleaning, so as to provide a single unit instead of three elements and so as to avoid all the manpower for assembling and dismantling necessary for each manufacture and each washing.

This advantage is all the more valuable if the introduction of the curd to be drained (or of the cheese the drainage of which is to be finished) is carried out mechanically and even automatically, since the machine and the automatic operation have only to act on a single composite element instead of three separate elements, which previously were set up manually and at the risk of becoming dislocated. Thus, the machine and possibly its automatic operation are all the more simple.

To this end, the assembly of the present invention is characterized in that it comprises connecting means between the multi-cavity mold, the table and possibly the blind, so that the multi-cavity mold (and possibly the blind) has a limited possibility of itself sliding parallel with respect to the table with which it is associated, between a normal position of use for drainage in which it rests on the table or possibly on the interposed blind, and a cleaning position in which it is no longer in contact with the table but is supported on abutments limiting its sliding.

According to a preferred form of the invention, the tables are each provided with at least two eye-bolts projecting from its upper surface and arranged opposite each other in the vicinity of one of the two opposite edges; and the multi-cavity molds (possibly as well as the blinds) comprise ears or extensions pierced by slots or holes engaged with a sufficient play on the eye-bolts so as to permit their sliding with respect thereto, abutments being provided at the ends of the eye-bolts to limit said sliding.

The accompanying drawings show an example of one form of the apparatus of the present invention. In the drawings.

Figure 1:
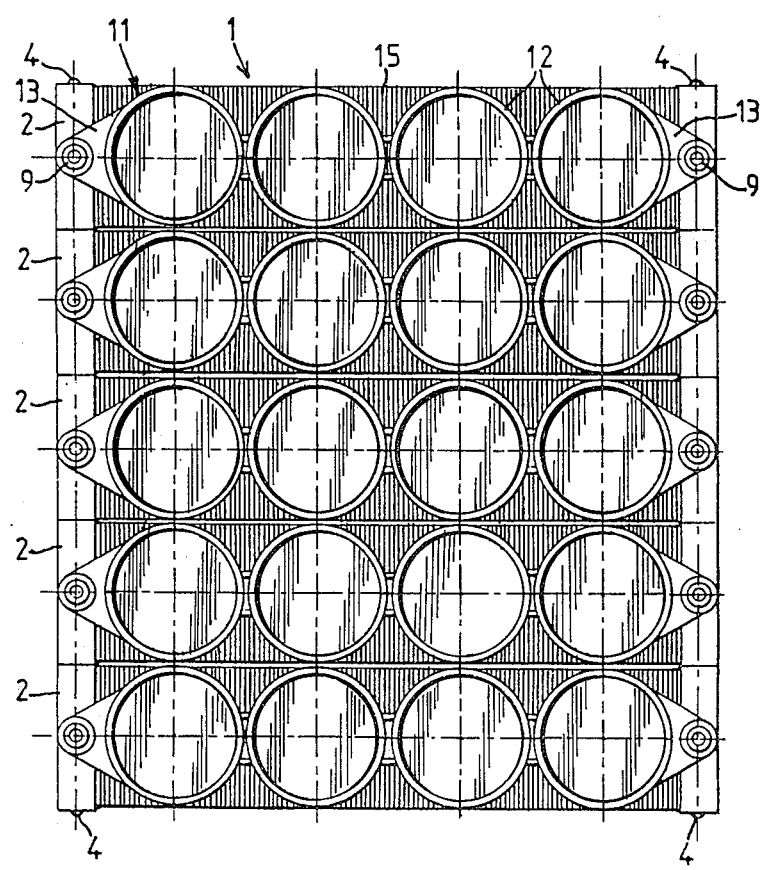
FIG. 1 is a plan view of the apparatus.

The illustrated table 1 is constituted by five similar elements 2 of plastic material assembled by pins 3 and bolts 4 engaged in transverse apertures provided for this purpose in the opposite ends of each element 2. The elements 2 are provided at each end with a projecting eye-bolt 5 the upper part of which has a vertical opening 6 into which can be forced a plug 7 forming a collar 8 and having a head 9. The lower portion of the eye-bolt 5 has an opening 10 intended to accommodate the head 9 of a plug 7 when the tables are stacked one upon the other.

The multi-cavity mold 11, also of plastic material, is constituted by four cylindrical elements 12 of circular section and has at each of its ends a lug or ear 13 pierced by a hole 14, engaging the eye-bolt 5. A blind (not shown) may be interposed between the multi-cavity mold and the corresponding table element and may have slots or holes also engaging the eye-bolts 5 and enabling them to slide.

Figure 2:
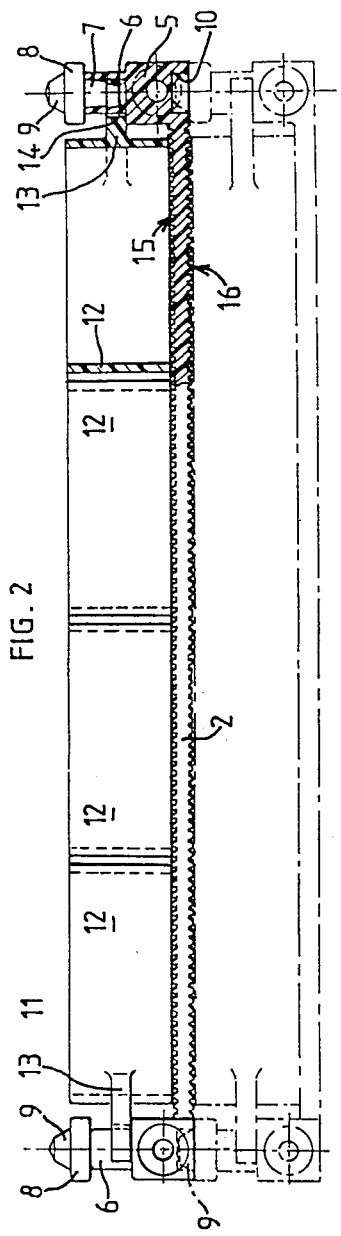
FIG. 2 is a view, partially in elevation and partially in section, of a multi-cavity mold of the apparatus mounted on the table.
Figure 3:
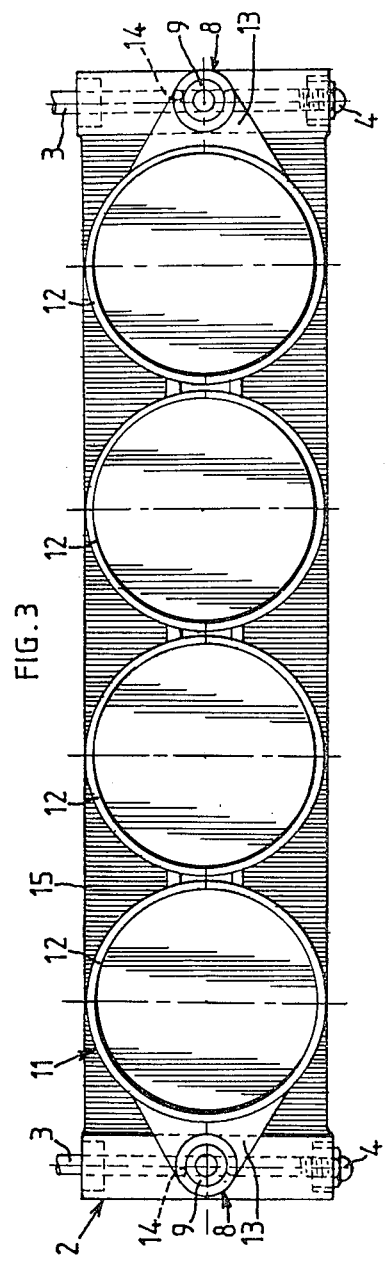
FIG. 3 is a corresponding plan view of said mold.

In the normal position shown in FIG. 2, and under the effect of its own weight, the multi-cavity mold 11 rests on the corresponding table element 2 (or possibly on the interposed blind. Thus, the draining may be effected normally and be aided by the grooves 15 in the upper surface of the table element.

These tables may be stacked as shown in FIG. 2; and in that case the lower surface 16 (also grooved) of the tables is practically at the level of the upper edge of the multi-cavity molds 12 in the lower row. In these conditions, when the assembly of these stacked tables is turned over to invert the sense of draining, the curd or the cheese inside the molds is maintained in as good a condition as when in the non-inverted position, and the draining is also effected just as well by virtue of the grooves 16 in the lower surface (now the upper) of the table. The draining may be facilitated by blinds (not shown) interposed between the table and the multi-cavity molds and which, for this purpose, may be fixed to each of the surfaces of the table, as by means of press-buttons.

Figure 4:
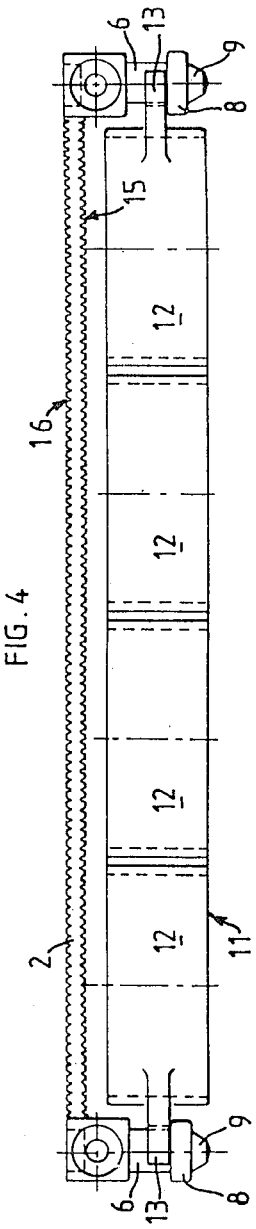
FIG. 4 is a view similar to that of FIG. 2 after inverting the mold.

After use, when it is desired to proceed with the washing of these multi-cavity molds and the tables which support them, they are inverted individually as shown in FIG. 4. In this case, however, the multi-cavity molds can slide under the effect of their own weight until their ears 13 are supported against the collars 8 of the plugs 7. In this position, a space is created between the surface of the table and the corresponding surface of the multi-cavity mold which enables the washing to proceed easily. The jets of solution from the cleaning or washing machine (which may be a washing tunnel or a turbulence washing vat) may pass into the spaces thus created while removing the remaining particles of curd or cheese and ensuring a satisfactory cleaning of the entire surface of the tables or benches, the blinds, and the surface of the multi-cavity molds.

It will be understood that the embodiment of the invention described above has been given purely by way of example and is in no way limiting, and that numerous modifications may be made without departing from the scope of the invention. For example, the table and the molds may be made of metal and especially of stainless steel. Also, although the table has been described as being constituted by a certain number of similar elements connected to one another by pins and forming a rigid assembly, the connections between these similar elements could be constituted by hinges permitting a longitudinal deformation of the tables. The latter could also be in a single piece; and the abutments limiting the sliding of the tables could be provided in any other manner than by the collar-forming plugs.

I claim:

1. Cheese-draining apparatus comprising a table formed by an assembly of separable table elements interconnected in side-by-side relation to form a group of draining surfaces lying substantially in a common plane, a multi-cavity mold coacting with each table element, and connecting means between each multi-cavity mold and the corresponding table element, the connecting means including means allowing the mold to slide toward and away from the corresponding table element between a normal position of use for draining, wherein the mold rests on the table element, and a cleaning position wherein the mold is spaced from the table element, the connecting means also including abutments for limiting said sliding of the mold and on which the mold is supported in said cleaning position thereof.

2. The apparatus of claim 1, in which said connecting means also includes two eye-bolts projecting from the upper surface of each table element near opposite edges thereof, the connecting means also including two ears on each mold through which the respective eye-bolts extend with sufficient play to enable said sliding of the mold, said abutments being located at the ends of said eye-bolts.

3. The apparatus of claim 2, in which each eye-bolt has an opening in its upper portion, each said abutment being formed by a plug fixed in a said opening.

4. The apparatus of claim 2, in which each eye-bolt has an opening in its upper portion, each said abutment being formed by a plug fixed in a said opening, the lower surface of each table element having openings coaxial with respective eye-bolts, each said plug having a head adapted to be received in a said opening in said lower surface of an overlying said apparatus, thereby permitting stacking of said table elements and inversion of the stacks of table elements.

5. The apparatus of claim 1, in which said table elements are similar elements fixed to one another.

6. The apparatus of claim 5, in which the similar table elements are articulated to one another to permit longitudinal deformation of the table.

7. The apparatus of claim 5, in which a multi-cavity mold comprises a single row of molds corresponding to each table element.

8. The apparatus of claim 1, in which the table elements and molds are of plastic material.

9. The apparatus of claim 1, in which said table elements have transverse openings at opposite edge portions thereof, the apparatus comprising also means extending through said transverse openings for interconnecting the table elements in said side-by-side relation to form said table.

* * * * *